US 9,406,217 B2

(12) United States Patent
Sievert et al.

(10) Patent No.: US 9,406,217 B2
(45) Date of Patent: Aug. 2, 2016

(54) CONVERTIBLE WIRELESS REMOTE CONTROL

(75) Inventors: Michael Sievert, Yarrow Point, WA (US); Robert D. Dickinson, III, Woodinville, WA (US); Blake C. Ramsdell, Sammamish, WA (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1867 days.

(21) Appl. No.: 12/494,568

(22) Filed: Jun. 30, 2009

(65) Prior Publication Data

US 2010/0127884 A1    May 27, 2010

Related U.S. Application Data

(60) Provisional application No. 61/116,972, filed on Nov. 21, 2008.

(51) Int. Cl.
*G08B 5/22* (2006.01)
*G08C 17/00* (2006.01)
*G06Q 30/02* (2012.01)

(52) U.S. Cl.
CPC ............ *G08C 17/00* (2013.01); *G06Q 30/0254* (2013.01); *G06Q 30/0255* (2013.01)

(58) Field of Classification Search
CPC . G06Q 30/0254; G06Q 30/0255; G08C 17/00
USPC .................... 340/12.22; 398/106, 112, 114
See application file for complete search history.

(56) References Cited

U.S. PATENT DOCUMENTS

| | | | | |
|---|---|---|---|---|
| 5,583,560 | A | * | 12/1996 | Florin et al. ............... 725/40 |
| 6,240,555 | B1 | | 5/2001 | Shoff et al. |
| 6,327,459 | B2 | * | 12/2001 | Redford et al. ......... 434/307 R |
| 6,650,867 | B2 | * | 11/2003 | Redford et al. ......... 434/307 R |
| 7,123,242 | B1 | | 10/2006 | Henty |
| 7,421,376 | B1 | | 9/2008 | Caruso et al. |
| 7,516,074 | B2 | | 4/2009 | Bilobrov |
| 2005/0078087 | A1 | | 4/2005 | Gates et al. |
| 2007/0030251 | A1 | * | 2/2007 | Henty ........................ 345/169 |
| 2007/0142101 | A1 | | 6/2007 | Seshagiri et al. |
| 2007/0180461 | A1 | | 8/2007 | Hilton |
| 2008/0218397 | A1 | * | 9/2008 | Zylka et al. ................ 341/176 |

(Continued)

FOREIGN PATENT DOCUMENTS

CN    2705962 A1    6/2005
CN    201075199 Y    6/2008

(Continued)

OTHER PUBLICATIONS

Website, 3 pages, available at http://en.wikipedia.org/wiki/Digital_video_fingerprinting, as of Jan. 21, 2011.

(Continued)

*Primary Examiner* — Steven Lim
*Assistant Examiner* — Omeed Alizada
(74) *Attorney, Agent, or Firm* — Ference & Associates LLC

(57) ABSTRACT

The invention provides a convertible wireless remote control suitable for controlling a computer of a media management system offering an integrated multimedia experience. The invention controls the media management system wirelessly with a small amount of buttons but is convertible to offer expanded and/or changed functionality to the user, as desired.

6 Claims, 7 Drawing Sheets

(56) References Cited

U.S. PATENT DOCUMENTS

| | | | |
|---|---|---|---|
| 2008/0239168 A1* | 10/2008 | Henty | 348/734 |
| 2008/0246890 A1 | 10/2008 | Henty | |
| 2008/0311963 A1 | 12/2008 | Strawn | |
| 2009/0002218 A1* | 1/2009 | Rigazio et al. | 341/176 |
| 2010/0188249 A1 | 7/2010 | Sievert et al. | |
| 2010/0248933 A1 | 9/2010 | Eder et al. | |
| 2011/0128228 A1 | 6/2011 | Van der Byl | |
| 2011/0151935 A1 | 6/2011 | Oksman et al. | |
| 2012/0119873 A1 | 5/2012 | Ramsdell et al. | |

FOREIGN PATENT DOCUMENTS

| | | |
|---|---|---|
| CN | 101432979 A1 | 5/2009 |
| CN | 101510973 A1 | 8/2009 |
| EP | 1023807 | 7/2002 |
| JP | 2004120248 A | 4/2004 |

OTHER PUBLICATIONS

Website, 1 page, available at http://www.digitalsmiths.com, as of Feb. 4, 2011.

Alizada, Omeed, Notice of Allowance in U.S. Appl. No. 12/751,933, Dec. 5, 2013, 10 pages.

Alizada, Omeed, Final Office Action in U.S. Appl. No. 12/751,933, Jul. 30, 2013, 22 pages.

Alizada, Omeed, Office Action in U.S. Appl. No. 12/751,933, Mar. 14, 2013, 17 pages.

Sievert, Michael, Amendment in Response to Non-Final Office Action in U.S. Appl. No. 12/751,933, Jun. 14, 2013, 12 pages.

Sievert, Michael, Amendment in Response to Final Office Action in U.S. Appl. No. 12/751,933, Oct. 30, 2013, 15 pages.

Syed, Nabil, Office Action in U.S. Appl. No. 12/944,837, Oct. 18, 2012, 8 pages.

Ramsdell, Blake Charles, Amendment in Response to Non-Final Office Action in U.S. Appl. No. 12/944,837, Jan. 18, 2013, 8 pages.

Syed, Nabil, Final Office Action in U.S. Appl. No. 12/944,837, Apr. 22, 2013, 11 pages.

Ramsdell, Blake Charles, Amendment in Response to Final Office Action in U.S. Appl. No. 12/944,837, Jul. 22, 2013, 9 pages.

Syed, Nabil, Office Action in U.S. Appl. No. 12/944,837, Oct. 1, 2013, 10 pages.

Ramsdell, Blake Charles, Amendment in Response to Office Action in U.S. Appl. No. 12/944,837, Dec. 23, 2013, 10 pages.

Syed, Nabil, Final Office Action in U.S. Appl. No. 12/944,837, Apr. 3, 2014, 14 pages.

Ramsdell, Blake Charles, Amendment After Final in U.S. Appl. No. 12/944,837, Jun. 3, 2014, 13 pages.

Syed, Nabil, Advisory Action in U.S. Appl. No. 12/944,837, Jun. 12, 2014, 3 pages.

Ramsdell, Blake Charles, Notice of Appeal in U.S. Appl. No. 12/944,837, 2 pages.

Ramsdell, Blake Charles, Appeal Brief in U.S. Appl. No. 12/944,837, 23 pages.

Syed, Nabil, Examiner's Answer to Appeal Brief in U.S. Appl. No. 12/944,837, 8 pages.

Ramsdell, Blake Charles, Reply Brief in U.S. Appl. No. 12/944,837, 17 pages.

* cited by examiner

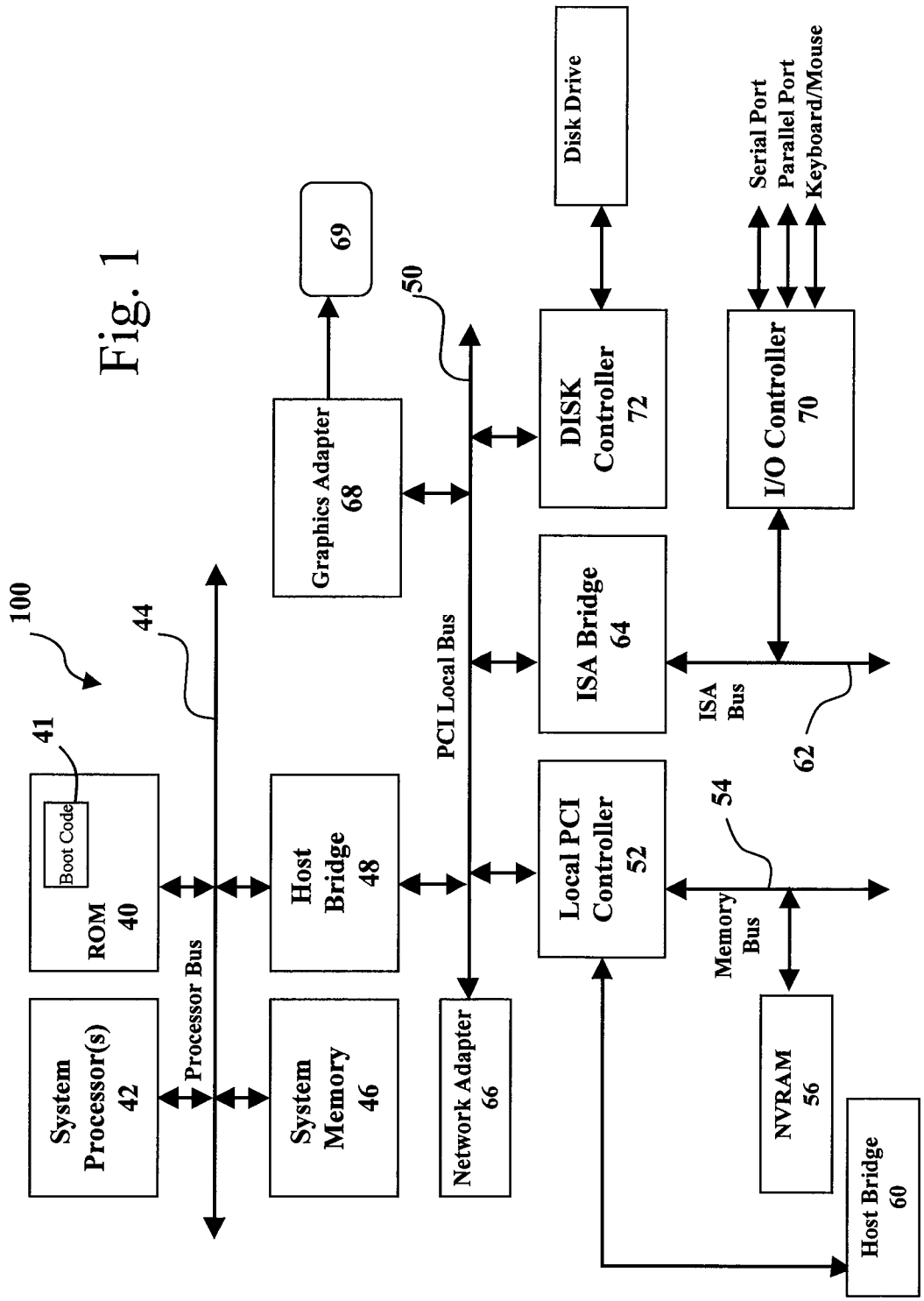

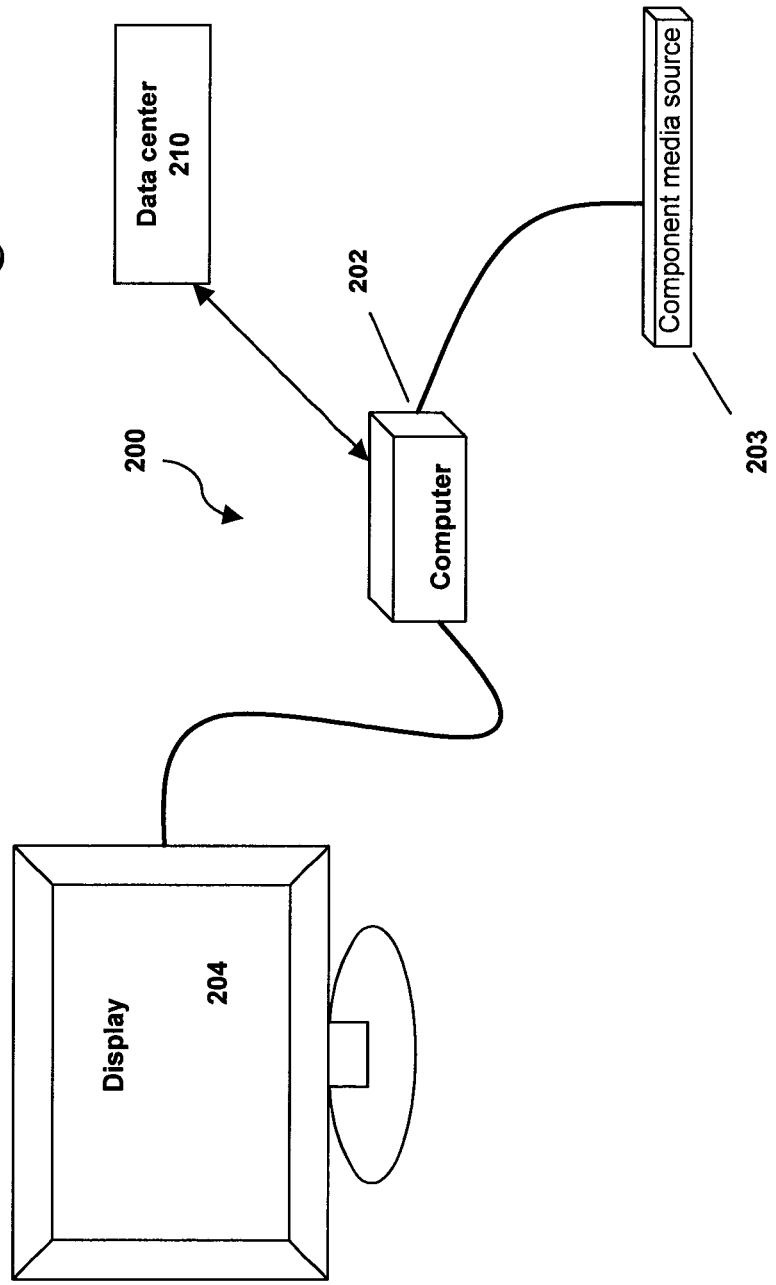

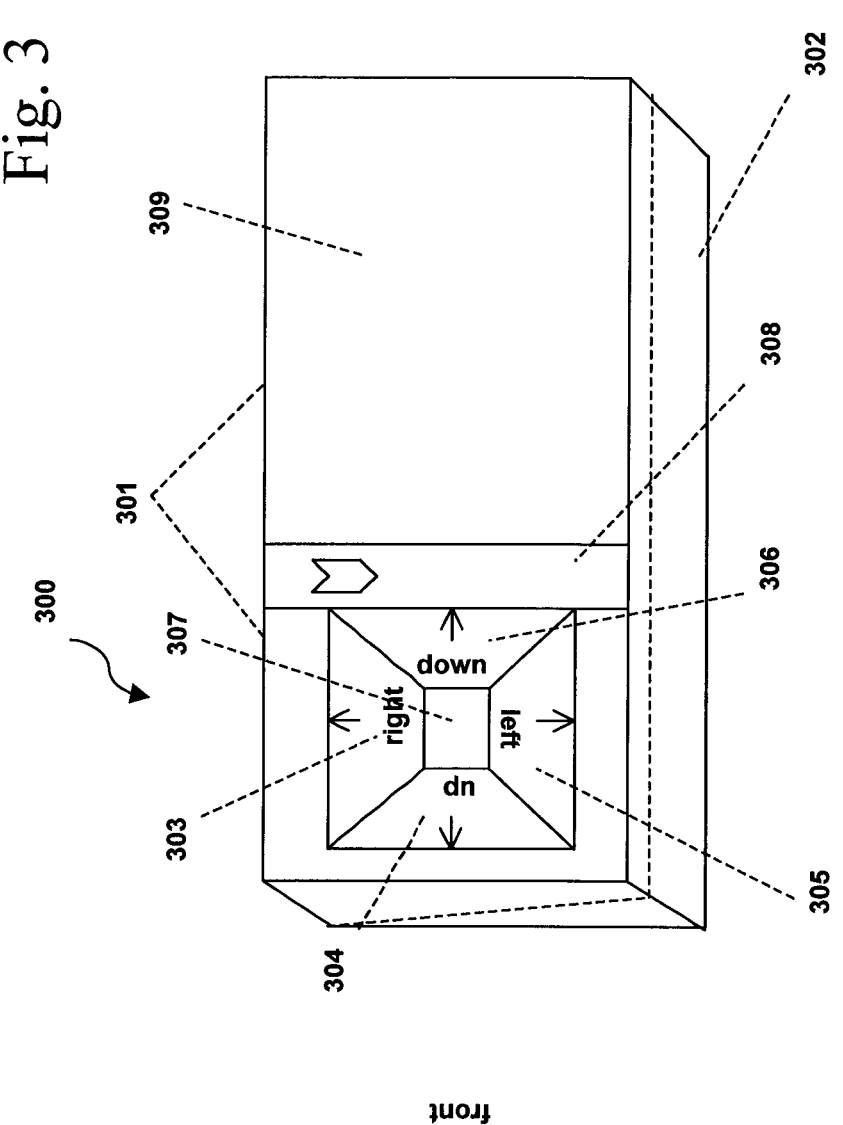

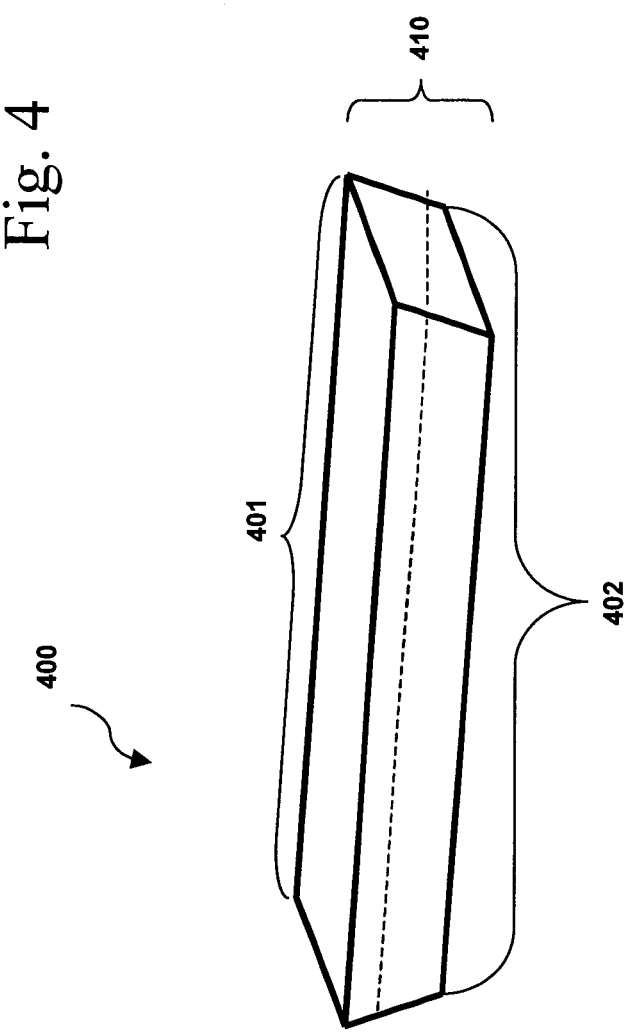

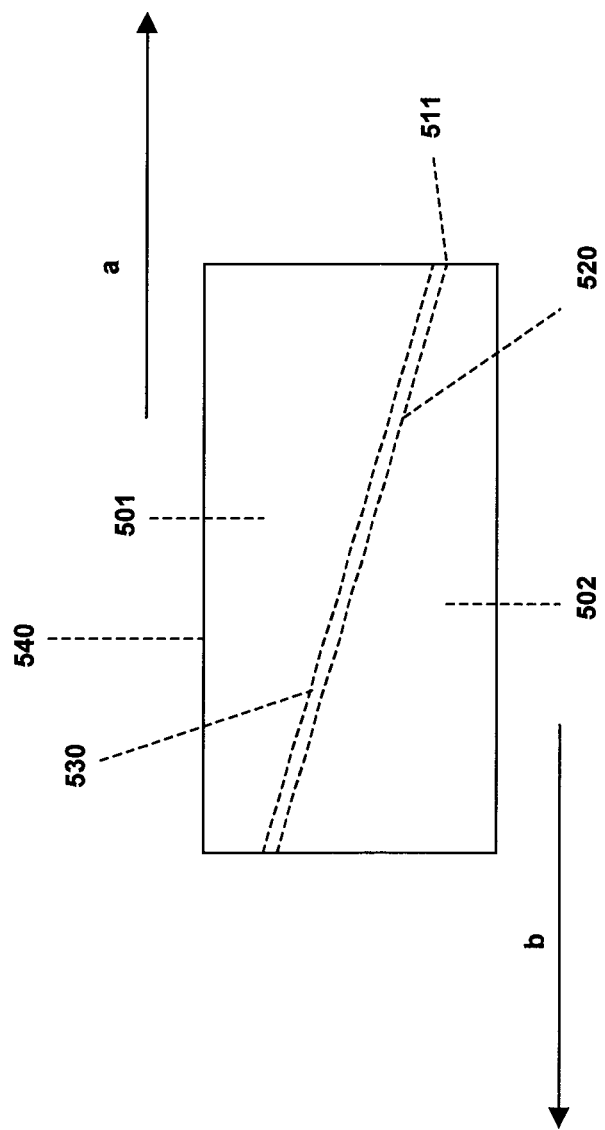

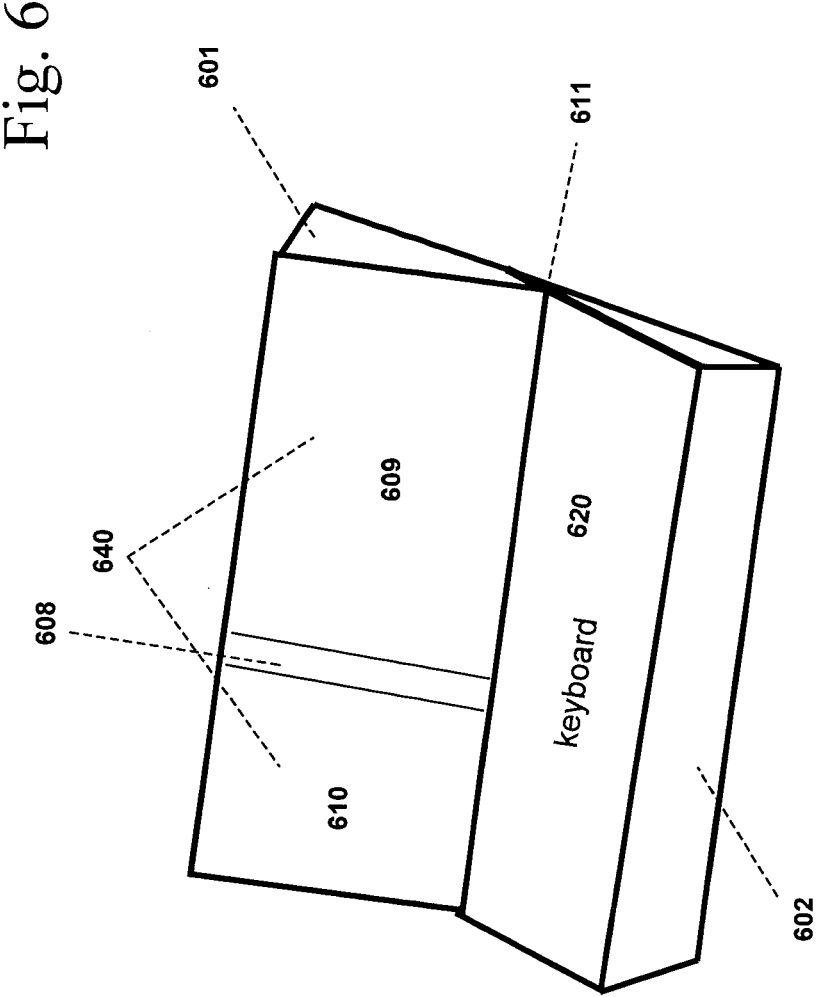

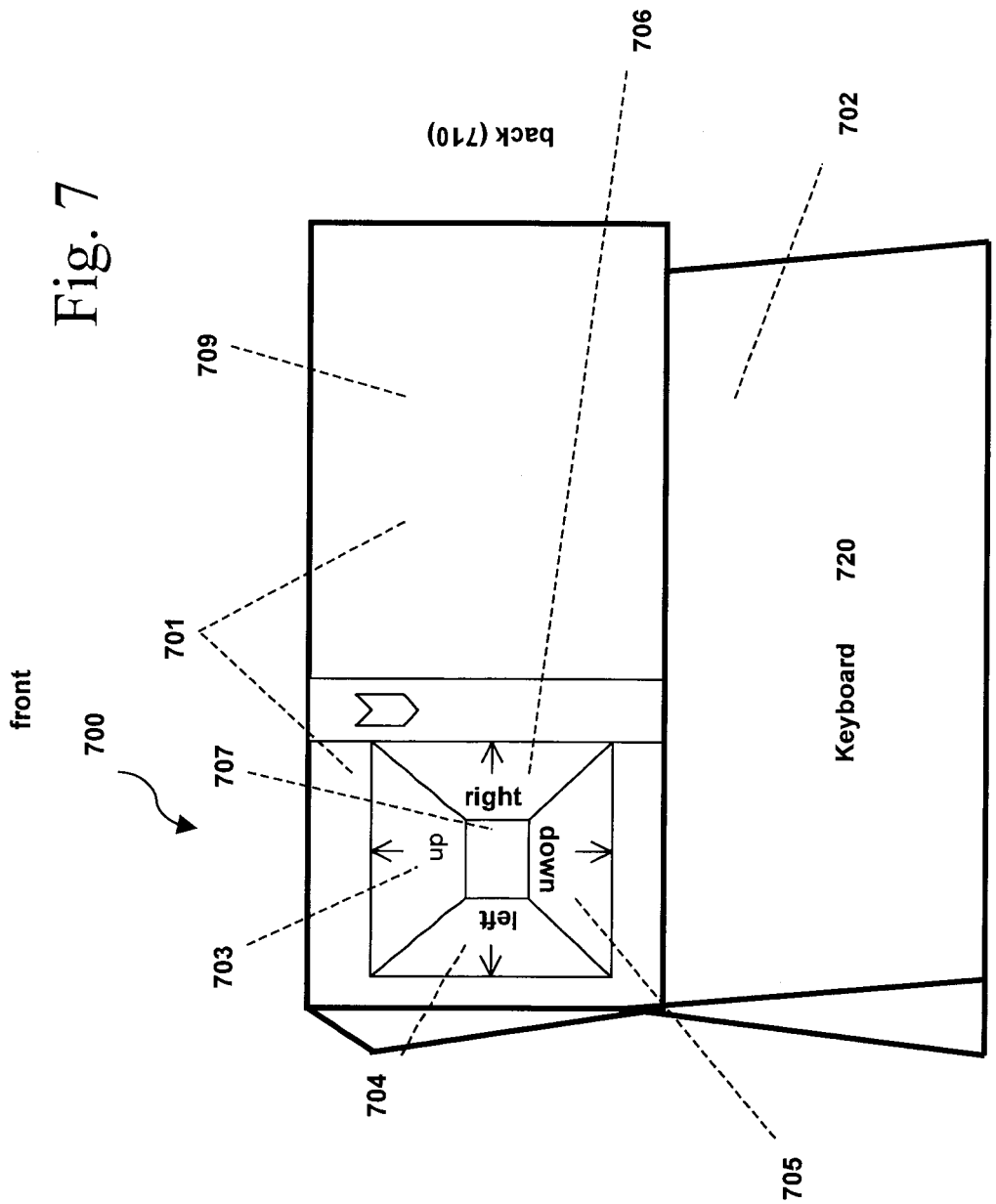

CONVERTIBLE WIRELESS REMOTE CONTROL

CLAIM FOR PRIORITY

This application claims priority from U.S. Provisional Patent Application No. 61/116,972, filed Nov. 21, 2008, which is fully incorporated by reference herein.

FIELD OF THE INVENTION

The invention is directed to devices for control of a multimedia management system. Specifically, the invention is directed to providing users with a convertible wireless remote control.

BACKGROUND OF THE INVENTION

A wide variety of remote controls are conventionally available for controlling a wide variety of devices including but not limited to media devices and players (e.g. Televisions, DVD players, VCRs, stereos, etc.), and media receivers (e.g. cable TV boxes, satellite TV receivers, etc.). Even if the user has one remote control for all devices, these conventional remote controls often have a multitude of buttons and/or superfluous controls that can cause confusion for users.

In addition, consumers are increasingly accessing Internet content to supplement more traditional media experiences. Common examples include using other devices including but not limited to laptop and desktop computers, cell phones, smart phones, etc. to obtain web pages while watching a television show.

Utilization of these various devices in order to obtain a variety of desired media is less than ideal, as users must repeatedly switch between devices and applications. Moreover, users are often forced to handle multiple remote control devices to utilize multiple media sources, e.g. to watch television and surf the Internet.

Accordingly, the inventors have recognized a need for an integrated system and remote control thereof that seamlessly combines the various capabilities of conventional devices, providing a truly integrated and easily controlled multimedia experience.

SUMMARY OF THE INVENTION

At least one presently preferred embodiment of the invention provides a convertible wireless remote control suitable for controlling a computer of a media management system offering an integrated multimedia experience. The invention controls the media management system wirelessly with a small amount of buttons but is convertible to offer expanded and/or changed functionality to the user, as desired.

In summary, one aspect of the invention provides an apparatus comprising: a first portion having a first control set; and a second portion having a second control set; the first control set and second control set configured to enable control of one or more electronic devices; the first portion and the second portion being slideably connected and configurable in an open position and a closed position; wherein, in response to obtaining the open position, the apparatus is configured to alter one or more functions of one or more of the first control set and the second control set.

Another aspect of the invention provides an apparatus comprising: a first wedge portion slideably mounted atop a second wedge portion; and a switch; the first wedge portion having one or more controls thereon; and the second wedge portion having one or more other controls thereon; wherein the switch is configured to switch one or more functions of the one or more controls in response to the first wedge portion and the second wedge portion being slid to an open position.

A further aspect of the invention provides a convertible wireless remote control comprising: a first portion having one or more controls thereon; and a second portion having one or more other controls thereon; wherein the first portion and the second portion are configurable between a first position and a second position; wherein, in the first position, one or more of the one or more controls has a first function associated therewith; and wherein, in the second position, the one or more of the one or more controls has a second function associated therewith.

For a better understanding of the present invention, together with other and further features and advantages thereof, reference is made to the following description, taken in conjunction with the accompanying drawings, and the scope of the invention will be pointed out in the appended claims.

BRIEF DESCRIPTION OF THE DRAWINGS

FIG. 1 illustrates a block diagram of a computer system.
FIG. 2 illustrates a media management system.
FIG. 3 illustrates a convertible wireless remote control.
FIG. 4 illustrates a side view of a convertible wireless remote control.
FIG. 5 illustrates an end view of a convertible wireless remote control.
FIG. 6 illustrates an opened view of a convertible wireless remote control.
FIG. 7 illustrates an opened view of a convertible wireless remote control.

DETAILED DESCRIPTION OF THE INVENTION

It will be readily understood that the components of the present invention, as generally described and illustrated in the figures herein, may be arranged and designed in a wide variety of different configurations in addition to the described presently preferred embodiments. Thus, the following more detailed description of the embodiments of the present invention, as represented in the figures, is not intended to limit the scope of the invention, as claimed, but is merely representative of selected presently preferred embodiments of the invention.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings. The following description is intended only by way of example, and simply illustrates certain selected presently preferred embodiments of the invention as claimed herein.

As noted above, conventional devices used for media management do not provide an integrated experience for the user. In contrast, systems, devices and methods for providing an integrated media experience are described in co-pending and commonly owned U.S. patent application Ser. No. 12/415,638, filed on Mar. 31, 2009, and Ser. No. 12/463,020, filed on May 8, 2009, and the application entitled "System and Method for Distributed Local Content Identification", filed concurrently herewith, all of which are incorporated by reference herein. These applications provide some useful information on media management systems that can identify a variety of media content, obtain related content based on the identification, and integrate/overlay media content from a plurality of sources for selective, combined display.

According to one embodiment of the invention, a convertible wireless remote control is configured to control a computer of such a media management system. This convertible wireless remote control offers a wide variety of functions to the user with a simplified user interface that is convertible and thus can be expanded to provide the user an increased amount of control, as desired.

There are a variety of scenarios where remote control of a computer is useful. One of these scenarios is when a computer of a media management system is connected to a conventional display (e.g. a high definition television set (HDTV)), and the user is located in close proximity, using the media management system to view some form of combined media (e.g. a television program and related web sites). In such a television watching scenario, users would benefit from a wireless control device that is convertible, such that it allows for at least two modes of use. One mode could be, for example, a simplified mode requiring only minimal computer control (corresponding to the use context where the user is focusing on watching the television program). Another mode could be, for example, an involved mode that may require text entry and/or a refined pointing/selection method (e.g. a provided by a mouse, touch pad, trackball, joystick, etc., corresponding to the use context where the user wishes to select and view a related web site(s)).

The computer of the media management system can be controlled by a variety of remote control devices, including, according to one embodiment of the invention, a unique dual-mode convertible wireless remote control, as shown and described herein. This convertible wireless remote control can be used to control a traditional computer (e.g. a laptop or desktop computer), since the communication functions as described herein (e.g. with the computer of the media management system) can accomplish communication with computing devices via an appropriate signal (e.g. radio frequency) transmitted to an appropriate transceiver (e.g. a USB transceiver) operatively connected to the computing device. The transceiver can be located inside the system case of the computer and thus hidden or plugged into the USB port (e.g. external transceiver).

According to one embodiment of the invention, the convertible wireless remote control comprises a wireless controller design and accompanying software and hardware to enable the dual modes of use. Accordingly, it should be understood that a combination of hardware and software can be utilized to implement the functionality of the convertible wireless remote control as described herein.

Referring now to FIG. 1, there is depicted a block diagram of an illustrative embodiment of a computer system 100. The illustrative embodiment depicted in FIG. 1 may be a notebook computer system, such as one of the ThinkPad® series of personal computers sold by Lenovo (US) Inc. of Morrisville, N.C. or a workstation computer, such as the Thinkstation®, which is also sold by Lenovo (US) Inc. of Morrisville, N.C. As will become apparent from the following description, however, the present invention is applicable to operation by any appropriately configured data processing system or other electronic device.

As shown in FIG. 1, computer system 100 includes at least one system processor 42, which is coupled to a Read-Only Memory (ROM) 40 and a system memory 46 by a processor bus 44. System processor 42, which may comprise one of the AMD™ line of processors produced by AMD Corporation or a processor produced by Intel Corporation, is a general-purpose processor that executes boot code 41 stored within ROM 40 at power-on and thereafter processes data under the control of operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 100 to LAN, and graphics adapter 68, which interfaces computer system 100 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 100 further includes Industry Standard Architecture (ISA) bus 62, which is coupled to PCI local bus 50 by ISA bridge 64. Coupled to ISA bus 62 is an input/output (I/O) controller 70, which controls communication between computer system 100 and attached peripheral devices such as a keyboard, mouse, and a disk drive. In addition, I/O controller 70 supports external communication by computer system 100 via serial and parallel ports. The USB Bus and USB Controller (not shown) are part of the Local PCI controller (52).

FIG. 2 depicts a non-limiting example of a media management system 200 configured according to one embodiment of the invention. The computer system 100 described above is for example a computer 202 of media management system 200. As shown, a component media source 203 (e.g. cable TV box, satellite receiver, etc.) is connected to the computer 202, which is in turn connected to at least one main display 204 (e.g. HDTV set, computer monitor, etc.). A user first plugs his or her existing component media source 203 into the computer 202. The component media source 203 may provide uncompressed digital data via a high definition multimedia interface (HDMI) or other digital or analog connection types. Then, the user plugs the computer 202 into the display device 204. The computer is appropriately connected (e.g. via network connection) to a remote data center (210).

The media management system enables an integrated multimedia experience by performing information capturing and identification of component source media (e.g. a television program), retrieval of related content (e.g. Internet content/web pages) and selective combined display of media from the component source 203 and related media content. Exemplary media management systems are again described in the co-pending and commonly assigned United States patent applications noted above.

According to one embodiment of the invention, a convertible wireless remote control is provided that allows the user to easily interface with the media management system using this convenient convertible wireless device. FIGS. 3-7 show exemplary configurations for a convertible wireless remote device according to at least one embodiment of the invention.

FIG. 3 shows a top view of a convertible wireless remote control 300. As shown, the convertible wireless remote control 300 includes a top portion 301 and a bottom portion 302. The top portion 301 and the bottom portion 302 are selectively separable by opening the convertible wireless remote control, as further described below, and the portions are indicated as separate with dashed lines.

The top portion 301 (near the "front") contains a bank of controls (303-308) for use in the simplified mode, as described above, e.g. where a user needs only minimal control over the media management system. The controls (303-308) of the top portion 301 provide the user with a variety of controls at the "front" of the device, i.e. that portion that would normally be oriented towards the computer of the media management system during use (e.g. that portion of the convertible wireless remote control extending outward from the hand (not shown) of a user between the thumb and the first finger).

The controls at the "front" of the device preferably include an "up" button 304, a "down" button 306, a "left" button 305 and a "right" button 303. These buttons enable movement, in the respective directions, of a visible indicator (e.g. highlighted selection) upon a display 204 when the user presses the appropriate button. The bank of controls of the convertible wireless remote also preferably includes a "select" button 307 for selecting with the visible indicator (e.g. selecting a highlighted selection for execution, e.g. a link to a web site located in a queue on the side of a combined display). Situated below the buttons 303-307 (i.e. towards the "bottom" 310) is a back button 308 for undoing a previous selection (e.g. returning to the previous screen or menu on the display 204). This bank of buttons is useful for example when interfacing with the media management system in a simplified mode, such as when a cue of related web site links is provided on a side panel of the main display (204) during a television program.

Near the "back" 310 of the convertible wireless control there is preferably a convertible surface 309. The convertible surface 309 is configured for selective activation, for example when the convertible wireless device is opened by the user (as described below in connection with FIG. 6). The convertible surface 309 functions are selectively activated. It is presently preferred that the convertible surface 309 be a touch pad, such as a touch pad provided by Synaptics® Corp., which is selectively activated. Though many selective activation schemes may be employed for activating the convertible surface 309, it is presently preferred that the touch pad functionality be activated upon the user opening the convertible wireless remote control. Thus, the convertible surface will not be activated during use with the convertible wireless remote control in the simplified mode (i.e. when the convertible wireless remote control is closed). Though the touch pad functionality of the convertible surface 309 is inactive in the closed configuration, limited functionality may be enabled. For example, back-lighting and limited areas of the touch pad could be enabled in this configuration, providing one or more virtual "buttons" or lighting at particular areas of the touch pad for desired functions.

FIG. 4 illustrates a side on view of the convertible wireless remote control 400 for better appreciation of the wedged shape employed. As shown, the top portion 401 and the bottom portion 402 are shaped into wedges (as indicated by the dashed lines). Thus, upon the top portion 401 and the bottom portion 402 being separated, i.e. when a user opens the device, two wedge shapes are apparent when the device is viewed from the back 410, as in FIG. 5. One wedge forms the top portion 401 and the other, symmetrical wedge forms the bottom portion 402.

As above, FIG. 5 shows a view from the "back" (e.g. 310) of the convertible wireless remote control. The top portion 501 is formed in a first wedge shape which lays on top of the symmetrical bottom portion 502, forming a second wedge shape. A top surface of the top portion is indicated at 540. A bottom surface 530 of the top portion 501 is adjacent to a top surface 520 of the bottom portion 502 in the closed position. The arrows indicate the movement (e.g. sliding) of the top portion 501 and the bottom portion 502 upon opening. Arrow "a" (to the right) indicates the movement of the top portion 501 relative to the bottom portion 502 upon user separation of the two portions. Similarly, arrow "b" (to the left) indicates the movement of the bottom portion 502 relative to the top portion 501 upon user separation of the two portions. The two portions separate only so far, as they remain connected by a connection point 511, as discussed below in connection with FIG. 6.

FIG. 6 illustrates a convertible wireless remote control in the opened or separated form. This opened configuration is optimal for use of the convertible wireless remote control in the "involved" mode, i.e. when the user needs further refined control over the media management system.

As shown, the top portion 601 and the bottom portion have been separated (e.g. by user opening in the directions indicated in FIG. 5). Upon opening, the wedges slide about one another, exposing the top surface 620 of the bottom portion 602. The top portion 601 and associated controls (e.g. bank of controls 610, buttons 303-308) are still accessible to the user in this configuration. Moreover, the wedges provide a user-friendly shape for further use. Because of the unique wedge shape employed for the top portion 601 and the bottom portion 602 and their relative orientation, the top surface 640 of the top portion 601 remains visible and active upon opening, thus allowing the user to employ buttons (not shown) of the control bank in this configuration. The wedge shapes also promote easier use of convertible surface 609, e.g. as a touch pad, because convertible surface lies on approximately coincident on the same plane as that of surface 620.

Moreover, as discussed above, the selectively active convertible surface 609, for example a touch pad, is activated upon opening of the convertible wireless remote control. The selective activation permits the convertible surface 609 to remain inactive when the convertible wireless remote control remains closed, yet activate (and thus provide touch pad functionality) upon opening of the convertible wireless remote control.

The involved mode is one in which the user desires to have further control over the computer of the media management system. For example, the media management system may be providing web sites related to the television program being viewed by the user, i.e. providing combined display. If the user wishes to select one of the web pages and view it, the user is enabled to utilize either the bank of controls 610 or the touch pad function of the convertible surface 609. For example, the combined display could include a queue of related web site links, e.g. displayed on a side panel of the combined display. Thus, the user could scroll through this queue and select a web site to be visited utilizing the buttons of the bank of controls 610. Alternatively, the user could move a visible cursor upon the combined display with the convertible surface 609 touch pad function and select a link to the web page.

Notably, the top surface 620 of the bottom portion includes additional buttons. Preferably this includes a full keyboard as indicated in FIG. 6, though many keypad or other user interface alternatives (e.g. other buttons, an additional touch screen or display, etc.) could be utilized. Providing the keyboard thus gives the user an option to type in phrases (e.g. for Internet queries utilizing a web browser of the media management system's computer). Accordingly, the functionality of the convertible wireless remote device is greatly expanded upon the user opening (converting) the device.

FIG. 7 illustrates a convertible wireless remote control 700 in the opened position. The reference characters in FIG. 7 correspond to those of FIG. 3 incremented by 400. Notably, the convertible wireless remote control, upon conversion (opening) can switch functionality of select controls. As already discussed, convertible surface 709 can be activated upon opening.

As another example, the bank of controls previously containing up, down, left and right buttons in certain positions (up at 304, down at 306, left at 305, and right at 303), is preferably functionally altered. Upon opening, these buttons are converted for easier use in a different holding orientation. In the open position, the convertible wireless remote control is best utilized with the keyboard (on top surface 720) of bottom portion 702 facing the user, i.e. such that the user can hold the convertible wireless remote control and type with his or her thumbs. Thus, the functionality of the buttons of the bank of controls switches to button 704 being a left button, button 706 being a right button, button 703 being an up button, and button 705 being a down button. This corresponds to the orientation shown in FIG. 7, in which the "front" of the device is now considered rotated 90 degrees from that of FIG. 3, as indicated (i.e. the "front" of the device, as held by the user, is facing the media management system). Though "up", "down", "left" and "right" are indicated on the buttons, use of arrows is preferred, as the use of the actual words may cause confusion upon conversion (i.e. these are simply included in the illustration for clarity). Again, the convertible surface 709 is activated in this orientation, preferably providing a touch pad functionality.

It should be noted that although it has been mentioned herein that the "front" of the device is facing the media management system, utilization of the appropriate communications (e.g. radio frequency) ensures that the convertible wireless remote still operates to effect the user manner as described regardless of which direction the user points it.

In brief recapitulation, at least one embodiment of the invention provides a convertible wireless remote control enabling at least two modes of operation. The two modes of operation correspond to use contexts in which the user will prefer either more or less wireless control over a computing device. Upon conversion, the convertible wireless remote control provides increased and/or altered functions.

It should be understood that many of the functional characteristics of the inventive system described in this specification may be implemented as modules. Modules may include hardware circuits such as one or more processors with memory, programmable logic, and/or discrete components. The hardware circuits may perform hardwired logic functions, execute computer readable programs stored on tangible storage devices, and/or execute programmed functions. The computer readable programs may in combination with a computer system and the other described elements perform the functions of the invention.

It will be readily understood by those having ordinary skill in the art that embodiments of the present invention may take the form of an entirely hardware embodiment or an embodiment containing both hardware and software elements. An embodiment that is implemented in software may include, but is not limited to, firmware, resident software, microcode, etc.

The computer readable programs may be stored in tangible computer/machine-readable (apparatus readable) medium. Examples of a computer/machine-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Accordingly, elements of the present invention may be implemented on at least one electronic device running suitable software programs. These may also be implemented on at least one Integrated Circuit or part of at least one Integrated Circuit. Thus, it is to be understood that the invention may be implemented in a combination of both hardware and software. Again, computer/machine-readable programs may in combination with an electronic device perform the functions of the invention.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

In the drawings and specification there has been set forth a preferred embodiment of the invention and, although specific terms are used, the description thus given uses terminology in a generic and descriptive sense only and not for purposes of limitation.

If not otherwise stated herein, it is to be assumed that all patents, patent applications, patent publications and other publications (including web-based publications) mentioned and cited herein are hereby fully incorporated by reference herein as if set forth in their entirety.

It should be noted that the indefinite article "a" as used in this disclosure might be interpreted to mean "one or more".

What is claimed is:

1. A convertible wireless remote control comprising:
   a first portion having one or more controls thereon; and
   a second portion having one or more other controls thereon;
   wherein the first portion and the second portion are configurable between a first position and a second position;
   wherein, in the first position, one or more of the one or more controls has a first function associated therewith; and
   wherein, in the second position, the one or more of the one or more controls has a second function associated therewith.

2. The convertible wireless remote control according to claim 1, wherein the one or more controls comprise directional buttons enabling selective highlighting of selections upon a combined display.

3. The convertible wireless remote control according to claim 1, wherein the one or more controls comprise a convertible surface configured to receive touch interface instructions; and further wherein the convertible surface is activated in the second position.

4. The convertible wireless remote control according to claim 1, wherein the one or more other controls comprise a keyboard.

5. The convertible wireless remote control according to claim 1, wherein the convertible wireless remote control is configured to communicate with one or more electronic devices via radio frequency.

6. The convertible wireless remote control according to claim 1, wherein the first portion is formed in a first wedge shape and wherein the second portion is formed in a second wedge shape.

\* \* \* \* \*